United States Patent
Mattei

(10) Patent No.: US 7,842,328 B2
(45) Date of Patent: Nov. 30, 2010

(54) CEREAL AND FRUIT OIL

(75) Inventor: Alissa Mattei, Gavorrano (IT)

(73) Assignee: Carapelli Firenze S.p.A, Tavarnelle Val de Pesa (IT)

( * ) Notice: Subject to any disclaimer, the term of this patent is extended or adjusted under 35 U.S.C. 154(b) by 1022 days.

(21) Appl. No.: 11/629,446

(22) PCT Filed: Jun. 14, 2004

(86) PCT No.: PCT/IT2004/000345

§ 371 (c)(1),
(2), (4) Date: Dec. 12, 2006

(87) PCT Pub. No.: WO2005/120242

PCT Pub. Date: Dec. 22, 2005

(65) Prior Publication Data

US 2007/0243306 A1 Oct. 18, 2007

(51) Int. Cl.
*A23D 9/00* (2006.01)

(52) U.S. Cl. ........................ 426/601; 426/606

(58) Field of Classification Search ................ 426/601
See application file for complete search history.

(56) References Cited

U.S. PATENT DOCUMENTS

| | | | | |
|---|---|---|---|---|
| 4,835,002 A | * | 5/1989 | Wolf et al. | 426/590 |
| 5,013,574 A | * | 5/1991 | Hassel | 426/612 |
| 5,290,581 A | * | 3/1994 | Campbell et al. | 426/570 |
| 5,296,249 A | * | 3/1994 | Todd, Jr. | 426/541 |
| 5,518,753 A | * | 5/1996 | Bracco et al. | 426/601 |
| 5,552,167 A | * | 9/1996 | Taylor et al. | 426/99 |
| 5,578,334 A | * | 11/1996 | Sundram et al. | 426/2 |
| 5,843,497 A | * | 12/1998 | Sundram et al. | 426/2 |
| 6,497,908 B1 | * | 12/2002 | Oshiro | 426/238 |
| 6,630,192 B2 | * | 10/2003 | Sundram et al. | 426/603 |
| 7,041,324 B2 | * | 5/2006 | Myhre | 426/72 |
| 7,175,866 B2 | * | 2/2007 | Parshall et al. | 426/72 |
| 7,214,400 B1 | * | 5/2007 | Zyzak et al. | 426/534 |

FOREIGN PATENT DOCUMENTS

IT  EP1046341  *  4/2000

OTHER PUBLICATIONS

Hui, Y. H. 1996. Bailey's Industrial Oil and Fat Products, 5th edition, vol. 1. John Wiley & Sons, Inc., New York, p. 444-447.*

* cited by examiner

*Primary Examiner*—Carolyn A Paden
(74) *Attorney, Agent, or Firm*—Abelman, Frayne & Schwab

(57) ABSTRACT

The present invention relates to a vegetable oil comprising a mixture of cereal oils and fruit oils. These are selected from: corn oil, rice oil, wheat germ oil, barley oil, oat oil, rye oil, sorgum oil and millet oil and walnut oil, blackcurrant oil, almond oil, hazelnut oil, apricot oil, peach oil, avocado oil, cherry oil, watermelon oil, melon oil, blueberry oil and orange oil.

18 Claims, No Drawings

CEREAL AND FRUIT OIL

The present invention relates to an oil for alimentary use.

The polyunsaturated fatty acids (vitamin F), particularly the essential fatty acids, the so-called omega 3 (for example linolenic acid) and omega 6 (for example linoleic acid) fatty acids, are not synthesised by our bodies and, hence, must be introduced in the diet. Particularly, linolenic acid and linoleic acid are precursors of essential polyunsaturated fatty acids such as eicosapentaenoic acid and docosahexaenoic acid, which play important roles in our bodies: for example, they regulate plasma lipid levels, maintaining the fluidity of cellular membranes thus providing the arterial walls with elasticity and, hence, regulating arterial pressure, thus protecting the cardiovascular system, they promote the vitality of the cells of the central nervous system, with anti-depressive functions, they enhance the immune defences and attenuate inflammatory reactions. Another very important substance for bodily wellbeing is vitamin E, which possesses antioxidant activity and is hence implied in the protection of cell membranes from the formation of lipoperoxides, capable of damaging the lipid layer of the membranes themselves. Vitamin E is also involved in cellular respiration at the mitochondrial level and is, hence, necessary for the production of energy for cellular protein synthesis. There is hence the need for providing an oil which, despite being obtained in the most natural way possible, is rich in such beneficial substances and may thus be offered as a nutritionally valid oil.

Furthermore, such oil should also be useable above all as a raw dressing, so that such beneficial substances do not undergo any degradation, with the consequential partial or total loss of their properties. For this reason, the oil should have a taste that is pleasant and acceptable, above all in those countries outside the Mediterranean area, not having the tradition of using olive oil.

Hence, the object of the present invention is an oil as defined in the enclosed claims.

The inventive oil is a cereal and fruit oil, derived from the mixing of oils naturally rich in the above mentioned substances.

It has been observed that an additional very important substance for the wellbeing of the human body is gamma oryzanol. The latter is a mixture of substances including sterols, ferulic acid and terpene alcohols. Gamma oryzanol, found exclusively in rice oil, helps to lower blood triglyceride levels, interacts with the hormone LH and, hence, helps control the effects of the menopause and raises endorphin, testosterone and growth hormone levels. It has hence been observed that a nutritionally valid oil may be obtained using a certain amount of rice oil, as will be shown in detail below.

Cereal and fruit oils are excellent sources of polyunsaturated fatty acids, gamma oryzanol and vitamin E. Particularly, the polyunsaturated fatty acid content of fruit oils may exceed 80%, and vitamin E may exceed 0.2% in cereal germ oils. There are a number of dietary supplements or solid and liquid foods on the market to which the essential substances described above have been added, in order to obtain richer products, from the nutritional point of view. But such oils do not contain the "bouquet" of nutritionally important substances which only a vegetable oil may have.

Cereal and fruit oils are natural foodstuffs in that they are obtained directly from cereals and from fruit without any further addition of active substances (for example, vitamins, omega 3, omega 6, gamma oryzanol etc.), in as much as said active ingredients are already present in the starting products themselves. By mixing said cereal and fruit oils, one may obtain a natural product having excellent nutritional properties also endowed with a surprisingly good and particular flavour, deriving mainly from the fruit oils and from the natural flavourings added.

The present invention relates to an oil obtained from the mixing of vegetable oils, characterised in that said oils are one or more cereal oils and one or more fruit oils. Preferably, said oil comprises a mixture of several cereal oils and a mixture of several fruit oils.

Said cereal oils are selected from: corn oil, rice oil, wheat germ oil, barley oil, oat oil, rye oil, sorgum oil and millet oil.

Preferably, said oils are corn oil, rice oil and wheat germ oil.

Said fruit oils are selected from: walnut oil, blackcurrant oil, almond oil, hazelnut oil, apricot oil, peach oil, avocado oil, cherry oil, watermelon oil, melon oil, blueberry oil and orange oil. Preferably they are hazelnut oil, blackcurrant oil, apricot oil, cherry oil and orange oil. Even more preferably they are hazelnut oil and blackcurrant oil.

Besides the cereal oils and the fruit oils, said oil may optionally comprise one or more flavourings.

Said flavourings are: natural flavourings, nature-identical flavourings, essential cereal oil and essential fruit oil and mixtures thereof.

Preferably, said cereal and fruit flavourings are: barley, oats, corn, rice, rye, sorgum, wheat, millet, walnut, almond, hazelnut, blackcurrant, apricot, peach, avocado, cherry, watermelon, melon, blueberry, orange and vanilla flavouring.

Even more preferably, said cereal and fruit flavourings are: corn, rice, wheat, walnut, almond, hazelnut, blackcurrant, apricot and peach flavouring. More preferably it is natural cereal flavouring.

The cereal and fruit oils are obtained according to techniques known in the field, most commonly extraction or squeezing of the seeds or germ of the natural raw materials i.e. the cereals and the fruit. All those oils will preferably be refined, prior to their marketing, in order to correct acidity and the level of peroxides and so as to eliminate any unpleasant odours and flavours. The refining process may also partially eliminate those natural substances which provide each oil with its own characteristic flavour. The addition of natural flavourings allows the enhancement of the residual natural flavour, allowing to obtain a finished product having the desired flavour.

The oil forming the object of the present invention is obtained by mixing one or more cereal oils and one or more fruit oils in appropriate quantities in order to obtain the desired flavour, colour, consistency, density and nutritional value. The cereal oils are mixed in quantities of 70% to 98% by weight, preferably of 82% to 97.5% by weight, more preferably of 92% to 97% by weight. The fruit oils are mixed in quantities of 2% to 30% by weight, preferably of 2.5% to 18% by weight, more preferably of 3% to 8% by weight.

If the product of the invention comprises a single flavouring selected from those mentioned above, then the amount used is of 0.02% to 0.1% by weight, preferably of 0.03% to 0.07% by weight, with respect to the weight of the other components. If several flavourings are comprised, then the amount added is of 0.03% to 0.2% by weight, preferably of 0.05% to 0.15% by weight, with respect to the weight of the other components.

Ideally, the oil of the invention is a mixture of corn oil, rice oil, wheat germ oil, walnut oil and blackcurrant oil with the possible addition of natural flavourings.

Those oils are present in the mixture in the quantities reported in the following table 1.

TABLE 1

|  | Composition range (% by weight) | Preferred composition range (% by weight) |
|---|---|---|
| Corn oil | 84-92 | 85-88 |
| Rice oil | 8-13 | 9-12 |
| Wheat germ oil | 0.05-2 | 0.07-1.5 |
| Walnut oil | 1-4 | 2-3 |
| Blackcurrant oil | 0.05-0.5 | 0.1-0.3 |

Particularly, the present invention relates to a product comprising a lipid fraction consisting of fatty acids, omega 3 polyunsaturated fatty acids and vitamin F (polyunsaturated fatty acids) and also comprising vitamin E and γ-oryzanol in the quantities reported in the following table 2.

TABLE 2

|  | Components | Concentration range | Preferred concentration range |
|---|---|---|---|
| Lipid fraction | Fatty acids | 90-100%* | 95-100%* |
|  | Omega 3 | 0.5-2%* | 0.8-1.8%* |
|  | Vitamin F | 45-60%* | 46-54%* |
|  | Vitamin E | 0.01-0.40%** | 0.018-0.025%** |
|  | γ-oryzanol | 0.01-0.10%** | 0.02-0.04%** |

*The percentages of fatty acids, omega 3 polyunsaturated fatty acids and vitamin F (polyunsaturated fatty acids) are expressed as percentages by weight of the final mixture;
**the percentages of γ-oryzanol and vitamin E are expressed as percentages by total weight of the lipid fraction.

Normally, the fatty acids include saturated, monounsaturated and polyunsaturated fatty acids (vitamin F) in the quantities reported in the following table 3:

TABLE 3

|  | Concentration range (% by weight) | Preferred concentration range (% by weight) |
|---|---|---|
| Saturated fatty acids | 10-20% | 14-18% |
| Monounsaturated fatty acids | 25-36% | 28-34% |
| Polyunsaturated fatty acids | 45-60% | 46-54% |

Preferably, said fatty acids have the composition reported in the following table 4.

TABLE 4

|  | Concentration range (% by weight) | Preferred concentration range (% by weight) |
|---|---|---|
| C16:0 | 7-18% | 10-15% |
| C16:1 | 0-2% | 0.01-0.15% |
| C18:0 | 0.5-3.5% | 1.5-3% |
| C18:1 | 25-37% | 28-35% |
| C18:2 | 44-56% | 47-52% |
| C18:3 (omega 3) | 0.5-2% | 0.8-1.8% |
| C18:4 | 0-0.05% | 0.005-0.02% |
| C20:0 | 0-1% | 0.3-0.8% |
| C20:1 | 0-0.3% | 0.04-0.2% |
| C22:0 | 0.05-0.3% | 0.08-0.2% |
| C24:0 | 0.05-0.4% | 0.08-0.3% |

All the percentage concentrations expressed herein are meant as percentages by weight of the final mixture.

The product forming the object of the present invention has a typical mean density of approx. 0.920 g/mL.

By mixing said cereal and fruit oils, one may obtain a natural product having excellent nutritional properties also endowed with a surprisingly good and particular flavour, deriving mainly from the presence of the fruit oils and from the natural flavourings added.

Besides being natural products with high nutritional content, the cereal and fruit oils used in order to prepare the product of the invention possess the further advantage of not having a very strong flavour.

This product is mainly considered for raw use as a dressing for salads, vegetables, grilled meats etc. It may also be used in the preparation of any other foodstuff, for example cakes, fried food, sauces etc.

EXAMPLE

The oil of the invention is obtained by mixing corn oil, rice oil, wheat germ oil, walnut oil, blackcurrant oil and natural flavourings having the percentage compositions reported in the following table 5.

TABLE 5

|  | Corn oil (% by weight) | Rice oil (% by weight) | Wheat germ oil (% by weight) | Walnut oil (% by weight) | Blackcurrant oil (% by weight) |
|---|---|---|---|---|---|
| Density (g/mL) | 0.921 | 0.916 | 0.921 | 0.923 | 0.924 |
| C16:0 | 12.1 | 19.4 | 15.5 | 7.5 | 6.5 |
| C16:1 | 0.1 | 0.3 | 0.2 | 0.1 | 0.1 |
| C18:0 | 2.0 | 2.1 | 0.8 | 2.8 | 1.7 |
| C18:1 | 31.2 | 44.0 | 18.5 | 16.7 | 10.8 |
| C18:2 | 53.0 | 31.5 | 56.6 | 60.2 | 48.4 |
| C18:3 (omega 3) | 0.7 | 0.6 | 6.2 | 12.4 | 28.4 |
| C18:4 | 0 | 0 | 0 | 0 | 3.7 |
| C20:0 | 0.5 | 1.2 | 0.2 | 0.1 | 0 |
| C20:1 | 0 | 0.5 | 1.7 | 0.2 | 0.4 |
| C22:0 | 0.2 | 0 | 0.1 | 0 | 0.1 |
| C24:0 | 0.2 | 0.4 | 0.2 | 0 | 0 |
| Saturates | 15.0 | 23.1 | 16.8 | 10.4 | 8.3 |
| Monounsaturates | 31.3 | 44.8 | 20.4 | 17.0 | 11.3 |
| Polyunsaturates | 53.7 | 32.1 | 62.8 | 72.6 | 80.5 |
| Total fatty acids | 100 | 100 | 100 | 100 | 100 |
| Vitamin F | 53.7 | 32.1 | 62.8 | 72.6 | 76.8 |

TABLE 5-continued

|  | Corn oil (% by weight) | Rice oil (% by weight) | Wheat germ oil (% by weight) | Walnut oil (% by weight) | Blackcurrant oil (% by weight) |
|---|---|---|---|---|---|
| (C18:2 and C18:3) | | | | | |
| γ-oryzanol* | 0 | 0.4 | 0 | 0 | 0 |
| Vitamin E* | 0.017 | 0.034 | 0.25 | 0 | 0 |

*The percentages of vitamin E and γ-oryzanol are expressed as percentages by total weight of the lipid fraction. All other percentages are expressed by weight of the final mixture.

The above mentioned oils are mixed in the quantities reported in table 6 together with the natural cereal flavourings.

TABLE 6

|  | Composition (% by weight) |
|---|---|
| Corn oil | 86% |
| Rice oil | 10% |
| Wheat germ oil | 1% |
| Walnut oil | 2.8% |
| Blackcurrant oil | 0.2% |
| Natural cereal flavourings | 0.05%* |

*percentage by weight with respect to the weight of the other components.

The mixture is stirred so as to achieve the perfect mixing of all the components.

Thus a product is obtained having the percentage composition and the nutritional values per 100 mL of oil, 15 reported in the following table 7.

TABLE 7

|  | % composition of the product | Nutritional values per 100 mL of product |
|---|---|---|
| Density | 0.920 | |
| C16:0 | 12.7 | |
| C16:1 | 0.1 | |
| C18:0 | 2.0 | |
| C18:1 | 31.9 | |
| C18:2 | 51.1 | |
| C18:3 (omega 3) | 1.1 | |
| C18:4 | 0.007 | |
| C20:0 | 0.6 | |
| C20:1 | 0.1 | |
| C22:0 | 0.2 | |
| C24:0 | 0.2 | |
| Saturates | 15.6 | 14.4 |
| Monounsaturates | 32.1 | 29.6 |
| Polyunsaturates | 52.2 | 48.1 |
| Total fatty acids | 100 | 92.1 |
| Vitamin E* | 0.021 | 21.0 mg (210% of RDA) |
| γ-oryzanol* | 0.04 | 40 mg |

*The percentages of vitamin E and γ-oryzanol are expressed as percentages by weight of the lipid fraction.

Unless otherwise specified, the percentages by weight reported throughout the text are meant as percentages by weight of the final mixed product.

The invention claimed is:

1. A vegetable oil comprising a mixture of vegetable oils, characterised in that said vegetable oils are one or more cereal oils mixed with one or more fruit oils, said cereal oils consisting of 86% corn oil by weight, 10% rice oil, by weight, 1% wheat germ oil by weight, said fruit oils consisting of 2.8% walnut oil, by weight and 0.2% black currant oil, by weight, characterized in that said vegetable oil comprises:
    saturated fatty acids 10-20%, by weight;
    monounsaturated fatty acids 25-36%, by weight;
    polyunsaturated fatty acids 45-60%, by weight, wherein the content of C18:3 is 0.5-2% by weight.

2. The oil according to claim 1, comprising one or more flavourings.

3. The oil according to claim 2 wherein said flavourings are selected from the group consisting of natural flavouring, nature-identical flavouring, essential cereal oil and essential fruit oil, and mixtures thereof.

4. The oil according to claim 3 wherein said cereal flavourings are selected from the following flavourings: barley, oats, corn, rice, rye, sorghum, wheat, and millet, and wherein said fruit flavorings are selected from the group consisting of walnut, almond, hazelnut, blackcurrant, apricot, peach, avocado, cherry, watermelon, melon, blueberry, orange and vanilla.

5. The oil according to claim 4, wherein said cereal and fruit flavourings are selected from the following flavourings: corn, rice, wheat, walnut, almond, hazelnut, blackcurrant, apricot and peach.

6. The oil according to claim 3, wherein said cereal flavourings are selected from the following flavourings: corn, rice, and wheat and wherein said fruit flavorings are selected from the group consisting of walnut, almond, hazelnut, blackcurrant, apricot and peach.

7. The oil according to claim 2 wherein, in the case a single flavouring is used, the amount of flavouring added to the product is comprised of between 0.02% and 0.1% by weight, with respect to the weight of the other components.

8. The oil according to claim 2, wherein in the case where several flavourings are used, the amount of flavourings added to the product is comprised of between 0.03% and 0.2%, by weight, with respect to the weight of the other components.

9. The oil according to claim 2, wherein, in the case where a single flavouring is used, the amount of flavouring added to the product is comprised of between 0.03% to 0.07% by weight, with respect to the weight of the other components.

10. The oil according to claim 2, wherein, in the case where several flavourings are used, the amount of flavourings added to the product is comprised of between 0.05 and 0.15%, by weight, with respect to the weight of the other components.

11. The oil according to claim 1 comprising: a lipid fraction comprising fatty acids in concentrations of from 90% to 100% by weight C18:2 and C18:3 in concentrations of from 45% to 60% by weight; Omega 3 fatty acids in concentrations of from 0.5% to 2% by weight, and also comprising γ-oryzanol in concentrations of from 0.01% to 0.10% over the total weight of the lipid fraction vitamin E in concentrations of from 0.01% to 0.40% over the weight of the lipid fraction.

12. The oil according to claim 11 wherein said fatty acids are:

saturates in concentrations of from 14% to 18% by weight; monounsaturates in concentrations of from 28% to 34% by weight; polyunsaturates in concentrations of from 46% to 54% by weight.

13. The oil according to claim 12, wherein said fatty acids comprise: C16:0 in concentrations of from 7% to 18% by weight; C16:1 in concentrations of from 0% to 2%; C18:0 in concentrations of from 0.5% to 3.5%; C18:1 in concentrations of from 25% to 37%; C18:2 in concentrations of from 44% to 56%; C18:3 (omega 3) in concentrations of from 0.5% to 2%; C18:4 in concentrations of from 0% to 0.05%; C20:0 in concentrations of from 0% to 1%; C20:1 in concentrations of from 0% to 0.3%; C22:0 in concentrations of from 0.05% to 0.3%; C24:0 in concentrations of from 0.05% to 0.4%.

14. The oil according to claim 11, wherein said fatty acids comprise: C 16:0 in concentrations of from 7% to 18% by weight; C16:1 in concentrations of from 0% to 2%; C18:0 in concentrations of from 0.5% to 3.5%; C18:1 in concentrations of from 25% to 37%; C18:2 in concentrations of from 44% to 56%; C18:3 (omega 3) in concentrations of from 0.8% to 1.8%; C18:4 in concentrations of from 0% to 0.05%; C20:0 in concentrations of from 0% to 1%; C20:1 in concentrations of from 0% to 0.3%; C22:0 in concentrations of from 0.05% to 0.3%; C24:0 in concentrations of from 0.05% to 0.4%.

15. The oil according to claim 1 comprising a lipid fraction comprising: 15.6% saturated fatty acids by weight, 32.1% monounsaturates by weight, 52.2% polyunsaturates (C18:2 and C18:3) by weight of which 1.1% by weight is Omega 3 fatty acids and also comprising: 0.021% vitamin E over the total weight of the lipid fraction and 0.04% y-oryzanol over the total weight of the lipid fraction.

16. The oil according to claim 15 wherein said saturated, monounsaturated and polyunsaturated fatty acids comprise: 12.7% C16:0; 0.1% C16:1; 2.0% C18:0; 31.9% C18:1; 51.1% C18:2; 1.1% C18:3(omega 3); 0.007% C18:4; 0.6% C20:0; 0.1% C20:1; 0.2% C22:0 and 0.2% C24:0.

17. The oil according to claim 1, wherein said one or more cereal oils are mixed in quantities of from 92% to 97% by weight.

18. The oil according to claim 1, wherein said one or more fruit oils are mixed in quantities of from 3% to 8%, by weight.

* * * * *